US010333190B2

(12) United States Patent
Cartaillac et al.

(10) Patent No.: US 10,333,190 B2
(45) Date of Patent: Jun. 25, 2019

(54) COMPACT MULTIFREQUENCY DUAL-POLARIZATION RADIOFREQUENCY EXCITER FOR A PRIMARY ANTENNA SOURCE AND A PRIMARY ANTENNA SOURCE EQUIPPED WITH SUCH A RADIOFREQUENCY EXCITER

(71) Applicant: THALES, Courbevoie (FR)

(72) Inventors: Erwan Cartaillac, Labatut (FR); Philippe Mader, Toulouse (FR)

(73) Assignee: THALES, Courbevoie (FR)

( * ) Notice: Subject to any disclaimer, the term of this patent is extended or adjusted under 35 U.S.C. 154(b) by 51 days.

(21) Appl. No.: 15/598,121

(22) Filed: May 17, 2017

(65) Prior Publication Data
US 2017/0346189 A1 Nov. 30, 2017

(30) Foreign Application Priority Data

May 24, 2016 (FR) ..................................... 16 00832

(51) Int. Cl.
| | |
|---|---|
| *H01P 1/213* | (2006.01) |
| *H01P 1/161* | (2006.01) |
| *H01Q 15/24* | (2006.01) |
| *H04B 1/38* | (2015.01) |
| *H01Q 5/40* | (2015.01) |
| *H01Q 1/52* | (2006.01) |
| *H01Q 13/10* | (2006.01) |
| *H01Q 13/02* | (2006.01) |

(52) U.S. Cl.
CPC ............ *H01P 1/2131* (2013.01); *H01P 1/161* (2013.01); *H01Q 1/52* (2013.01); *H01Q 5/40* (2015.01); *H01Q 13/02* (2013.01); *H01Q 13/0241* (2013.01); *H01Q 13/10* (2013.01); *H01Q 15/24* (2013.01); *H04B 1/38* (2013.01)

(58) Field of Classification Search
CPC ...... H01Q 15/24; H01Q 13/0241; H01Q 1/52; H01Q 5/40; H01Q 13/10; H01Q 13/02; H01P 1/161; H01P 1/2131; H04B 1/38
USPC .............................................. 333/21 R, 21 A
See application file for complete search history.

(56) References Cited

U.S. PATENT DOCUMENTS

| | | | | |
|---|---|---|---|---|
| 8,461,939 B2 * | 6/2013 | Lan | ......................... | H01P 1/161 333/126 |
| 2003/0222733 A1 * | 12/2003 | Ergene | ............... | H01Q 13/0208 333/125 |
| 2011/0109409 A1 | 5/2011 | Lan et al. | | |

FOREIGN PATENT DOCUMENTS

JP        S63-51701 A     3/1988

* cited by examiner

*Primary Examiner* — Robert J Pascal
*Assistant Examiner* — Jorge L Salazar, Jr.
(74) *Attorney, Agent, or Firm* — Baker & Hostetler LLP

(57) ABSTRACT

A radiofrequency exciter comprises a junction including an axial access intended to be connected to a horn antenna, at least four lateral accesses and at least four frequency filters that are associated with the four lateral accesses, respectively, the junction including, in series, a first coupling cavity equipped with two coupling slots that are able to sample a vertical polarization, and a second coupling cavity equipped with two coupling slots that are able to sample a horizontal polarization, the four frequency filters being connected directly to the four respective coupling slots, the first coupling cavity having a transverse cross-section having a constant vertical dimension and a horizontal dimension that decreases between the axial access and a transverse exit aperture of the first coupling cavity.

13 Claims, 3 Drawing Sheets

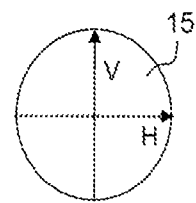
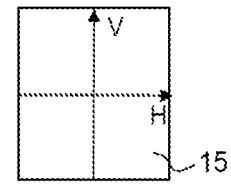
FIG.4a  FIG.5a
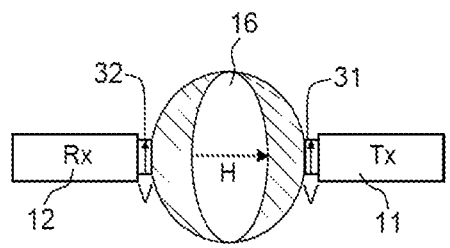
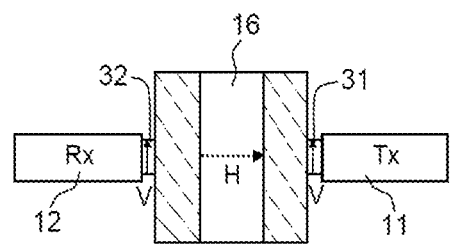
FIG.4b  FIG.5b
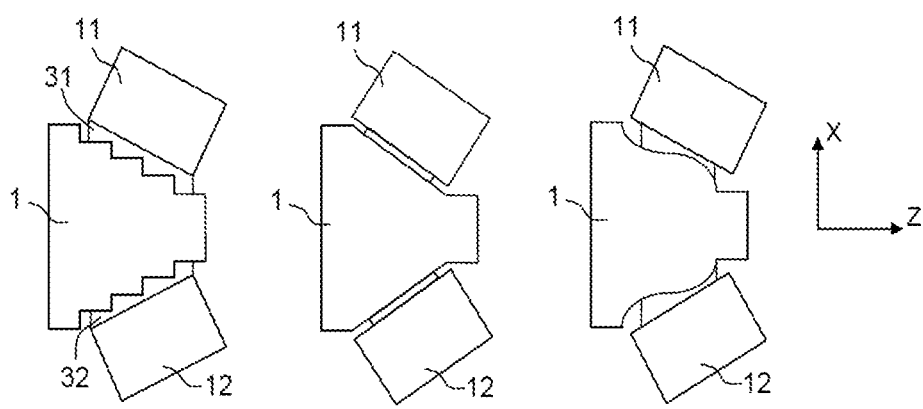
FIG.6a  FIG.6b  FIG.6c

COMPACT MULTIFREQUENCY DUAL-POLARIZATION RADIOFREQUENCY EXCITER FOR A PRIMARY ANTENNA SOURCE AND A PRIMARY ANTENNA SOURCE EQUIPPED WITH SUCH A RADIOFREQUENCY EXCITER

CROSS-REFERENCE TO RELATED APPLICATIONS

This application claims priority to foreign French patent application No. FR 1600832, filed on May 24, 2016, the disclosure of which is incorporated by reference in its entirety.

FIELD OF THE INVENTION

The present invention relates to a compact multifrequency dual-polarization radiofrequency exciter for a primary antenna source and to a primary antenna source equipped with such a radiofrequency exciter. It is applicable to the field of spatial telecommunications with antennae comprising one or more reflectors, whether these antennae be located on board satellites or on the ground, and in particular relates to primary sources operating in linear polarization for mono-beam or multibeam applications.

BACKGROUND

Ku-band missions are generally carried out using Gregorian antennae arranged on a satellite face that is oriented towards the Earth, commonly called the "Earth face", and/or with single-offset antennae arranged on a lateral face of a satellite, provision often being made for both these types of antennae architectures in a single satellite. Because of placement constraints, these two reflector-based antennae architectures require different primary source geometries that are specific to each architecture. As a result, to ensure the various antennae provide their radiofrequency signal emission and reception functions, many different radiofrequency RF parts must be manufactured, tested and assembled, this possibly on the one hand creating problems with the reliability and sustainability of the RF, mechanical and thermal performance of the antenna and on the other hand increasing the cost and weight of the antennae.

A primary antenna source conventionally consists of a radiating element, for example a horn, fed by a radiofrequency RF chain essentially including a radiofrequency RF exciter. Known radiofrequency exciters conventionally consist of a plurality of different devices that allow sequentially on the one hand polarizations to be separated, then on the other hand emission and reception frequency bands to be separated.

A dual-linear-polarization radiofrequency exciter may for example consist of an asymmetrical two-orthogonal-arm orthomode transducer intended to separate two linear polarizations, called the horizontal H and vertical V polarizations, respectively, and two duplexers intended to separate, for each of the two linear polarizations, the frequency band of operation of the horn into two, emission and reception, sub-bands, respectively. This architecture employs a limited number of components to separate the frequency bands and polarizations, but can only be used when the emission and reception frequency bands are close to each other because its bandwidth is low. Furthermore, the use of an asymmetric OMT makes the antenna highly sensitive to propagation modes of higher order than the fundamental mode, this possibly degrading the radiofrequency performance of the antenna.

Alternatively, a dual-linear-polarization radiofrequency exciter may, for example, consist of a four-arm orthomode junction associated with recombining devices for separating the two, emission and reception, frequency bands and for sampling, then recombining, the two polarizations in the emission frequency band, the orthomode junction being connected to an orthomode transducer for separating the two polarizations of the reception frequency band. The use of a four-arm orthomode junction associated with recombining devices makes this architecture very complex, very bulky, and very difficult to integrate into Gregorian antennas.

Alternatively, a dual-linear-polarization radiofrequency exciter may, for example, consist of an asymmetrical orthomode junction comprising two orthogonal arms located in the same plane, for separating the two, emission and reception, frequency bands and the two polarizations in the emission frequency band, then an orthomode transducer for separating the two polarizations of the reception frequency band. This architecture has a low bulk, but a level of decoupling of the two polarizations comprised between −18 and −22 dB for the highest frequency band, this being very unsatisfactory for mono-beam coverage missions, which have a decoupling requirement of about −50 dB, and for multibeam coverage missions, which have a decoupling requirement of about −35 dB. This poor decoupling of the two linear polarizations is due to the asymmetric structure of the orthomode junction.

SUMMARY OF THE INVENTION

The aim of the invention is to remedy the drawbacks of known dual-linear-polarization radiofrequency exciters and to provide a dual-linear-polarization radiofrequency exciter that has a more compact, simpler and less bulky architecture and includes fewer radiofrequency components and that can be used as standard in both Gregorian and single-offset type antennae.

To this end, the invention relates to a multifrequency dual-linear-polarization radiofrequency exciter in which the polarizations and emission and reception frequency bands are separated conjointly within a single radiofrequency component.

According to the invention, the compact multifrequency dual-linear-polarization radiofrequency exciter consists of a waveguide junction extending parallelly to a longitudinal axis and including an axial access intended to be connected to a horn antenna, at least four lateral accesses and at least four frequency filters that are associated with the four lateral accesses, respectively, the junction including, in series, a first coupling cavity equipped with two coupling slots that are able to sample a vertical polarization by magnetic or electric coupling, and a second coupling cavity equipped with two coupling slots that are able to sample a horizontal polarization by magnetic or electric coupling, the four frequency filters being connected directly to the four respective slots for coupling the two, vertical and horizontal, polarizations, the first coupling cavity having an internal transverse cross-section having a constant vertical dimension and a horizontal dimension that decreases between the axial access and a transverse exit aperture of the first coupling cavity.

Advantageously, the lateral filters connected to the two slots for coupling the vertical polarization may be a first filter centred on an emission first frequency band and a second filter centred on a reception second frequency band, respectively, and the lateral filters connected to the two slots for coupling the horizontal polarization may be a third filter centred on the emission first frequency band and a fourth filter centred on the reception second frequency band, respectively.

Advantageously, the second coupling cavity may have an internal transverse cross-section having a constant horizontal dimension and a vertical dimension that decreases between an entrance aperture and an exit aperture of the second coupling cavity.

Advantageously, the two slots for coupling the vertical polarization are parallel to each other and arranged, radially opposite, in peripheral walls of the first coupling cavity, and the two slots for coupling the horizontal polarization are parallel to each other and placed radially opposite in peripheral walls of the second coupling cavity.

Advantageously, the waveguide junction furthermore may include a third cavity for decoupling the two, horizontal and vertical, linear polarizations, the decoupling third cavity being located between the first coupling cavity and the second coupling cavity and having an internal transverse cross-section of constant horizontal and vertical dimensions.

Advantageously, the decoupling third cavity has a length comprised between zero and one quarter of the average wavelength guided in the emission frequency band.

Advantageously, the axial access may have a circular cross-section and the transverse exit aperture of the first coupling cavity may have an elliptical cross-section, the ellipse having a major axis oriented parallelly to the vertical dimension and a minor axis oriented parallelly to the horizontal dimension Advantageously, the transverse entrance aperture of the second coupling cavity may have an elliptical cross-section and the transverse exit aperture of the second coupling cavity may have a circular cross-section.

Alternatively, the axial access may have a square cross-section and the transverse exit aperture of the first coupling cavity may have a rectangular cross-section, the rectangle having a large side oriented parallelly to the vertical dimension and a small side oriented parallelly to the horizontal dimension.

Advantageously, the transverse cross-section of the first coupling cavity and of the second coupling cavity may decrease continually or in successive steps.

Advantageously, the radiofrequency exciter may include a plurality of waveguide junctions connected in series.

The invention also relates to a primary antenna source equipped with such a radiofrequency exciter.

BRIEF DESCRIPTION OF THE DRAWINGS

Other particularities and advantages of the invention will become clearly apparent from the rest of the description, which is given, by way of purely illustrative and nonlimiting example, with reference to the appended schematic drawings, which show:

FIGS. 4a and 4b: two schematics of transverse sections along two different transverse planes illustrating the shapes of the internal transverse cross-section of the first coupling cavity of the radiofrequency exciter, at the entrance and level with the coupling slots, respectively, according to a first exemplary embodiment of the invention;

FIGS. 5a and 5b: two schematics of transverse sections along two different transverse planes illustrating the shapes of the internal transverse cross-section of the first coupling cavity of the radiofrequency exciter, at the entrance and level with the coupling slots, respectively, according to a second exemplary embodiment of the invention;

FIGS. 6a, 6b and 6c: three schematics of longitudinal sections illustrating three examples of variation in the dimensions of the first and second coupling cavity of the radiofrequency exciter, according to the invention;

DETAILED DESCRIPTION

Figure 1:
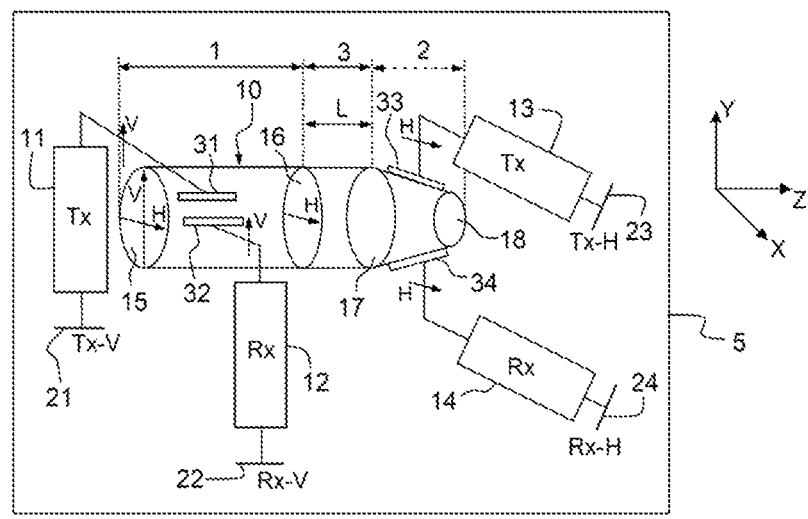
FIG. 1: a schematic diagram of an exemplary compact dual-linear-polarization radiofrequency exciter having two different frequency bands, according to the invention.
Figures 2, 3:
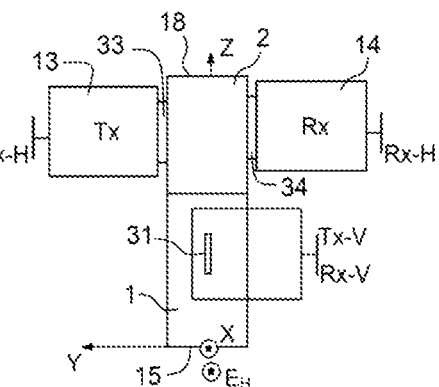
FIG. 2: a schematic of a longitudinal section along a plane XZ containing the vertical polarization, of a radiofrequency exciter, according to the invention.
FIG. 3: a schematic of a longitudinal section along a plane YZ containing the horizontal polarization, of the radiofrequency exciter in FIG. 2, according to the invention.

The radiofrequency exciter 5 shown in the schematic diagram in FIG. 1 and in longitudinal cross-section in FIGS. 2 and 3 consists of a longitudinal waveguide junction 10 including an axial access 15 intended to be connected to a horn antenna and at least four frequency filters 11, 12, 13, 14 associated with four lateral accesses 21, 22, 23, 24, respectively, the four frequency filters 11, 12, 13, 14 being connected directly to the junction by way of four respective coupling slots 31, 32, 33, 34 that are arranged in peripheral walls of the junction 10. The axial access 15 is an entrance aperture of the junction 10 the transverse dimensions of which, in two horizontal and vertical directions, respectively, are of equal values so as to allow radiofrequency waves polarized with two, horizontal and vertical, respectively, orthogonal linear polarizations to propagate, the direction of the polarization being, by convention, parallel to the electric field of the corresponding radiofrequency waves. For example, the transverse cross-section of the axial access may be circular or square. In the various FIGS. 1, 2, 3, the propagation direction of the radiofrequency waves is oriented along an axis Z, the horizontal polarization possibly being parallel to an axis X and the vertical polarization possibly being parallel to an axis Y.

The junction 10 includes two different coupling cavities 1, 2 that are arranged successively in series in the longitudinal direction Z, and that are dedicated to separating and sampling the two, vertical V and horizontal H, respectively, linear polarizations, respectively. The two, horizontal and vertical, polarizations are sampled through dedicated coupling slots. The two slots 31, 32 for sampling the vertical polarization V are parallel to each other and arranged, symmetrically and radially opposite, through the peripheral walls of the first coupling cavity 1. The two slots 33, 34 for coupling the horizontal polarization H are parallel to each other and arranged, symmetrically and radially opposite, through peripheral walls of the second coupling cavity 2. The orientation of the coupling slots may be parallel or perpendicular to the longitudinal direction Z corresponding to the propagation direction of the radiofrequency waves in the junction 10. In the case where the coupling slots are oriented parallelly to the longitudinal direction Z, as shown in the example in FIG. 1, the coupling is magnetic; when they are oriented perpendicularly to the longitudinal direction Z, the coupling is electric.

The first coupling cavity 1 includes a transverse entrance aperture formed by the axial access 15 and a transverse exit aperture 16 connected to a transverse entrance aperture 17 of the second coupling cavity 2. The first coupling cavity 1 equipped with its two coupling slots 31, 32 dedicated to sampling the vertical polarization, has an internal transverse cross-section having a constant vertical dimension but a horizontal dimension that decreases between the entrance aperture 15 and the exit aperture 16 of the first coupling cavity. Since the horizontal direction of the internal transverse cross-section of the first coupling cavity 1 decreases, the two polarizations H and V see the exit aperture 16 in the form of a vertically oriented slot. However, as a slot lets pass an electric field oriented parallelly to its small sides, the horizontal narrowing of the internal transverse cross-section forms a short-circuit plane for the signal component of vertical polarization V, which is then reflected and sampled by the two coupling slots 31, 32 of the first coupling cavity 1. In contrast, the signal component of H polarization does not encounter the short-circuit plane, and passes through the first coupling cavity and continues to propagate freely toward the second coupling cavity 2. For example, as shown in FIGS. 4a and 4b, the first coupling cavity may consist of a circular/elliptical transition when the axial access 15 has a circular cross-section and the exit aperture 16 has an elliptical cross-section, the ellipse having a major axis oriented parallelly to the vertical dimension and a minor axis oriented parallelly to the horizontal dimension. Alternatively, as shown in FIGS. 5a and 5b, the first coupling cavity may consist of a square/rectangular transition when the axial access 15 has a square cross-section and the exit aperture 16 has a rectangular cross-section, the rectangular cross-section having a length oriented parallelly to the vertical dimension and a width oriented parallelly to the horizontal dimension.

To separate the two frequency bands i.e. the emission frequency band Tx and the reception frequency band Rx, the two slots 31, 32 for coupling the vertical polarization V are connected to a first filter 11 centred on an emission first frequency band Tx and rejecting frequencies outside this first frequency band, and to a second filter 12 centred on a reception second frequency band Rx and rejecting frequencies outside this second frequency band, respectively. Thus, the first coupling cavity 1 includes, connected to the output of the first filter 11, a first lateral access 21 operating in vertical polarization V and in the emission first frequency band Tx and, connected to the output of the second filter 12, the first coupling cavity 1 includes a second lateral access 22 operating in vertical polarization V and in the reception second frequency band Rx.

Figure 7:
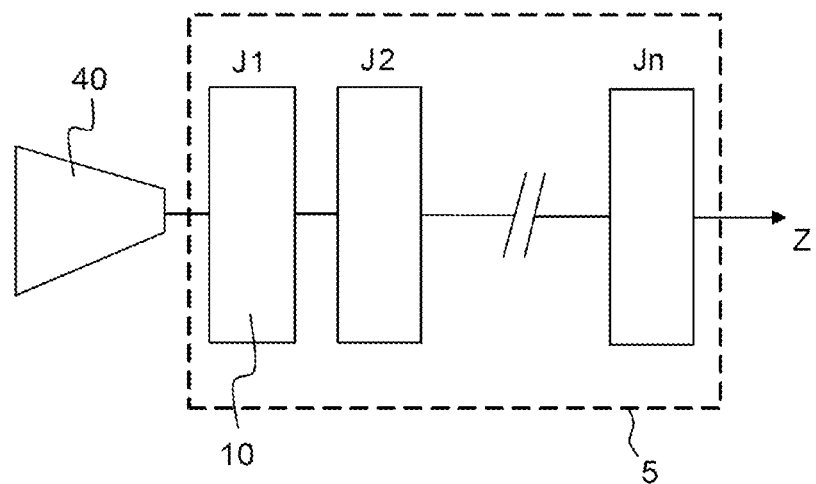
FIG. 7: a schematic diagram of an exemplary compact dual-linear-polarization radiofrequency exciter having n different operating frequency bands, where n is higher than two, according to the invention.

The second coupling cavity 2 includes an entrance aperture 17 connected to the exit aperture 16 of the first coupling cavity 1 and an exit 18 able to be connected to a terminal wall of the junction 10 or, as shown in the schematic diagram in FIG. 7, to one or more additional stages J2 to Jn of smaller dimensions and operating at frequencies higher than the frequencies of first and second frequency band. The second coupling cavity 2 is equipped with two coupling slots 33, 34 that are dedicated to sampling the horizontal polarization H and that are associated with a third filter 13 centred on the emission frequency band Tx and a fourth filter 14 centred on the reception frequency band Rx, respectively. As shown in FIG. 1, although it is not essential, the second coupling cavity 2 may advantageously have an internal transverse cross-section having a constant horizontal dimension and a vertical dimension that decreases between the entrance aperture 17 and the exit aperture 18 of the second coupling cavity 2, so as to obtain, at the exit 18 of the second coupling cavity, a transverse cross-section that is smaller but of identical shape to the transverse cross-section of the axial access 15 located at the entrance of the first coupling cavity. The decrease in the internal transverse cross-section of the second coupling cavity allows the percentage of bandwidth coupled to be increased.

Alternatively, the second coupling cavity 2 may have an internal transverse cross-section of constant horizontal and vertical dimensions, but in this case the coupled bandwidth will be lower.

Advantageously, as shown in the various exemplary embodiments illustrated in FIGS. 6a, 6b and 6c, the transverse cross-section of the first coupling cavity 1 and of the second coupling cavity 2 may gradually decrease continuously as in FIGS. 6b and 6c, or in successive steps as shown in FIG. 6a. Moreover, the profile of the first coupling cavity and of the second coupling cavity, in a longitudinal direction, may be linear or have a curvature that decreases according to a spline shape, as shown in FIG. 6c.

Advantageously, as shown in FIG. 1, the junction 10 may furthermore include a third cavity 3, intermediate between the first coupling cavity 1 and the second coupling cavity 2, the third cavity allowing the decoupling between the two, horizontal H and vertical V, linear polarizations to be improved. The decoupling third cavity 3 has a length L comprised between zero and one quarter of the average guided wavelength of the emission first frequency band Tx and an internal transverse cross-section of constant horizontal and vertical dimensions over its entire length. A length L equal to one quarter of the average guided wavelength of the emission first frequency band Tx allows a decoupling level of about −50 dB to be obtained between the vertical- and horizontal-polarization accesses, this being necessary for multibeam antennae applications. For a mono-beam antenna application, a decoupling between −30 dB and −35 dB is generally enough and the length L may be zero. In the case where the first coupling cavity 1 consists of a circular/elliptical transition, the third decoupling cavity 3 has an internal transverse cross-section of elliptical shape. In the case where the first coupling cavity 1 consists of a square/rectangular transition, the third decoupling cavity 3 has an internal transverse cross-section of rectangular shape.

As shown in FIG. 7, which illustrates a schematic diagram of an exemplary antenna radiation source operating in a plurality of frequency bands, to increase the number of operating frequencies it is possible to connect, in series, a plurality of junctions having structures identical to the structure of the junction 10, but smaller dimensions. In FIG. 7, the radiofrequency source includes a horn antenna 40 connected to a radiofrequency exciter 5 according to the invention. The radiofrequency exciter includes a plurality of different stages 10, J2, . . . , Jn, that are connected in series, each stage consisting of a junction according to the junction 10 shown in the schematic diagram of FIG. 1, the various junctions 10 and J2 to Jn being dedicated to different frequency bands. The frequencies of the frequency bands of the junctions J2 to Jn are increasingly high and higher than the frequencies of the first frequency band and second frequency band, i.e. the bands sampled by the junction 10.

Figure 8:
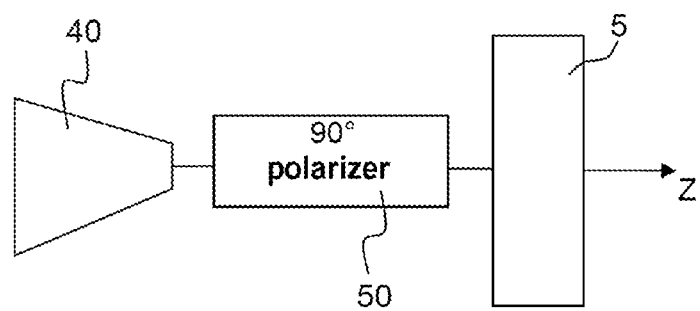
FIG. 8: a schematic diagram of an exemplary compact dual-circular-polarization radiofrequency exciter, according to the invention.

As shown in FIG. 8, instead of operating in linear polarization, it is also possible to use a radiation source that operates in circular polarization. To do this, it is enough to place a polarizer 50 between the horn antenna 40 and the radiofrequency exciter 5. The polarizer is intended to create a phase difference of 90° between the two polarizations H and V of the radiofrequency exciter 5.

Although the invention was described with reference to particular embodiments, it is clearly obvious that it is in no way limited thereto and that it comprises all the technical equivalents of the described means and their combinations if they fall within the scope of the invention.

The invention claimed is:

1. A compact multifrequency dual-linear-polarization radiofrequency exciter, comprising a waveguide junction extending parallel to a longitudinal axis and including an axial access intended to be connected to a horn antenna, at least four lateral accesses and at least four frequency filters that are associated with the four lateral accesses, respectively, the junction including, in series, a first coupling cavity equipped with two coupling slots that are able to sample a vertical polarization by magnetic or electric coupling, and a second coupling cavity equipped with two coupling slots that are able to sample a horizontal polarization by magnetic or electric coupling, the four frequency filters being connected directly to the four respective slots for coupling vertical and horizontal polarizations, the first coupling cavity having an internal transverse cross-section having a constant vertical dimension and a horizontal dimension that decreases between the axial access and a transverse exit aperture of the first coupling cavity.

2. The radiofrequency exciter according to claim 1, wherein the lateral filters connected to the two slots for coupling the vertical polarization are a first filter centred on an emission first frequency band and a second filter centred on a reception second frequency band, respectively, and wherein the lateral filters connected to the two slots for coupling the horizontal polarization are a third filter centred on the emission first frequency band and a fourth filter centred on the reception second frequency band, respectively.

3. The radiofrequency exciter according to claim 2, wherein the second coupling cavity has an internal transverse cross-section having a constant horizontal dimension and a vertical dimension that decreases between an entrance aperture and an exit aperture of the second coupling cavity.

4. The radiofrequency exciter according to claim 3, wherein the two slots for coupling the vertical polarization are parallel to each other and arranged, radially opposite, in peripheral walls of the first coupling cavity, and wherein the two slots for coupling the horizontal polarization are parallel to each other and placed radially opposite in peripheral walls of the second coupling cavity.

5. The radiofrequency exciter according to claim 3, wherein the transverse cross-section of the first coupling cavity and of the second coupling cavity decreases continually or in successive steps.

6. The radiofrequency exciter according to claim 5, comprising a plurality of waveguide junctions connected in series.

7. The radiofrequency exciter according to claim 2, wherein the waveguide junction further includes a third cavity for decoupling the two, horizontal and vertical, linear polarizations, the decoupling third cavity being located between the first coupling cavity and the second coupling cavity and having an internal transverse cross-section of constant horizontal and vertical dimensions.

8. The radiofrequency exciter according to claim 7, wherein the decoupling third cavity has a length comprised between zero and one quarter of the average wavelength guided in the emission frequency band.

9. The radiofrequency exciter according to claim 1, wherein the axial access has a square cross-section and the transverse exit aperture of the first coupling cavity has a rectangular cross-section, the rectangle having a large side oriented parallel to the vertical dimension and a small side oriented parallel to the horizontal dimension.

10. The radiofrequency exciter according to claim 1, wherein the axial access has a circular cross-section and the transverse exit aperture of the first coupling cavity has an elliptical cross-section, the ellipse having a major axis oriented parallel to the vertical dimension and a minor axis oriented parallel to the horizontal dimension.

11. The radiofrequency exciter according to claim 10, wherein the transverse entrance aperture of the second coupling cavity has an elliptical cross-section and the transverse exit aperture of the second coupling cavity has a circular cross-section.

12. A primary antenna source comprising a radiofrequency exciter according to claim 1.

13. The primary source according to claim 12, further comprising a polarizer connected to the axial access of the radiofrequency exciter.

* * * * *